(12) United States Patent
Halim et al.

(10) Patent No.: US 12,314,742 B2
(45) Date of Patent: May 27, 2025

(54) MULTIMEDIA CONTENT ACCESS WITHIN REMOVE DESKTOP SESSION

(71) Applicant: Hewlett-Packard Development Company, L.P., Spring, TX (US)

(72) Inventors: Irwan Halim, Spring, TX (US); Daniel Bungert, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/560,593

(22) PCT Filed: May 18, 2021

(86) PCT No.: PCT/US2021/032910
§ 371 (c)(1),
(2) Date: Nov. 13, 2023

(87) PCT Pub. No.: WO2022/245338
PCT Pub. Date: Nov. 24, 2022

(65) Prior Publication Data
US 2024/0256308 A1 Aug. 1, 2024

(51) Int. Cl.
*G06F 13/00* (2006.01)
*G06F 9/451* (2018.01)
*H04L 65/1101* (2022.01)

(52) U.S. Cl.
CPC .......... *G06F 9/452* (2018.02); *H04L 65/1101* (2022.05)

(58) Field of Classification Search
CPC .... G06F 9/452; G06F 3/0481; G06F 9/45529; G06F 9/45533; G06F 3/0484; H04L 65/1101

USPC ........ 709/241, 238–240, 227–229, 217–219, 709/231, 203
See application file for complete search history.

(56) References Cited

U.S. PATENT DOCUMENTS

| | | | |
|---|---|---|---|
| 7,676,549 B2* | 3/2010 | McKeon | H04L 67/08 715/740 |
| 8,261,315 B2* | 9/2012 | Barton | H04N 21/6405 725/153 |
| 9,106,696 B2* | 8/2015 | Pahlavan | H04L 63/08 |
| 12,147,821 B2* | 11/2024 | Reynolds | G06F 3/1454 |
| 2005/0216942 A1 | 9/2005 | Barton | |
| 2006/0271637 A1 | 11/2006 | Mckeon et al. | |
| 2010/0106798 A1 | 4/2010 | Barreto et al. | |
| 2010/0268940 A1 | 10/2010 | Pahlavan et al. | |
| 2011/0320963 A1 | 12/2011 | Wong | |
| 2013/0117416 A1 | 5/2013 | Sun et al. | |

(Continued)

FOREIGN PATENT DOCUMENTS

WO 2010/120585 A1 10/2010

*Primary Examiner* — Kenneth R Coulter
(74) *Attorney, Agent, or Firm* — Quarles & Brady LLP (57) ABSTRACT

A remote desktop session is established between a remote desktop host device and a remote desktop client device to permit remote usage of the remote desktop host device at the remote desktop client device. The remote desktop host device detects access of multimedia content at the remote desktop host device by the remote desktop client device within the remote desktop session. The remote desktop host device, in response to detecting access of the multimedia content within the remote desktop session, provides instructions to the remote desktop client device to directly access the multimedia content outside of the remote desktop session.

15 Claims, 8 Drawing Sheets

(56) References Cited

U.S. PATENT DOCUMENTS

2014/0310344 A1 10/2014 Venkatesh
2016/0219084 A1 7/2016 Abiezzi

* cited by examiner

MULTIMEDIA CONTENT ACCESS WITHIN REMOVE DESKTOP SESSION

BACKGROUND

Traditionally users have locally used computing devices, including desktop, laptop, notebook, and other types of computers as well as other types of computing devices, by being physically present at the computing devices. A user directly enters input at input devices, such as keyboards and pointing devices like mouses, of the computing device, and views output displayed on a display device, such as a monitor like a flat-panel display (FPD), of the computing device. More recently, users can instead remotely use computing devices via remote desktop software. A user can remotely use a host computing device within a remote desktop session established between the host device and a client computing device at which the user is physically located, as if the user were instead physically located at the host device.

DETAILED DESCRIPTION

As noted in the background, remote desktop software permits a user to remotely use a host computing device within a remote desktop session established between the host device and a client computing device at which the user is physically present, as if the user were instead physically located at the host device. User input at the client device is transmitted from the client device to the host device within the remote desktop session, and is treated at the host device as if it were directly entered at the host device. Output at the host device is similarly transmitted from the host device to the client device within the remote desktop session, and is displayed on the client device as if the client device originally generated the output.

Remote desktop software can provide a way by which users can remotely access their (host) computing devices when located away from the devices. Furthermore, remote desktop software can provide a way for enterprises and other organizations to better manage the computing environments of their users. For instance, a given host computing device may maintain multiple virtual machines corresponding to different users. Each user therefore remotely uses his or her virtual machine at a client computing device within a remote desktop session established between the host device and the client device. Users can be provided with less powerful and lower-cost client devices, such as thin client devices, that are used primarily to access the more powerful host device within remote desktop sessions.

A difficulty with remote desktop access of a host computing device at a client computing device within a remote desktop session is the access of multimedia content. Multimedia content can include both unidirectional, or one-way, video and audio content such as movies, music, and so on. When such multimedia content is accessed at a host device within a remote desktop session, the host device may render and play back the content. The played back content may then be captured and streamed from the host device to the client device at a given frame rate and output (e.g., displayed) at the client device. This process can result in less than optimal output quality of the multimedia content at the client device, however, including choppy and/or reduced resolution playback.

Multimedia content can also include bidirectional, or two-way, video and audio content such as video meetings and conferences and audio calls and conferences. The incoming part of the multimedia content is streamed or transmitted from the host computing device to a client computing device at a given frame rate for output at the client device. The outgoing part of the multimedia content is captured at the client device and transmitted to the host device. In addition to resulting in less than optimal output quality at the client device as with unidirectional multimedia content, this process can introduce lag and synchronization issues, making video meetings and conferences in particular practically unusable within remote desktop sessions.

Techniques described herein ameliorate these and other shortcomings. Multimedia content is accessed by a remote desktop client device at a remote desktop host device within a remote desktop session established between the host and client devices. Such multimedia content access is detected, and in response to detecting access of the multimedia content within the remote desktop session, the host device provides instructions to the client device to directly access the multimedia content outside of the remote desktop session. The host device then prevents (e.g., terminates) playback of the multimedia content at the host device within the remote desktop session.

The techniques can permit multimedia content to be directly accessed and played back at the remote desktop client device even if the multimedia content as initially accessed within the remote desktop session is inaccessible by or incompatible with the client device. For example, the host device but not the client device may be able to access a particular network location at which multimedia content is stored. In this case, the host device may copy the multimedia content to a different network location that is accessible by the client device, and instruct the client device to access the content at that location, or otherwise provide the client device with access to the content at the different location. For instance, the host device may establish a streaming service by which the client device can stream the multimedia content according to a specified streaming protocol.

As another example, the host device but not the client device may be compatible with the format in which the multimedia content is stored at the location at which the content is initially accessed within the remote desktop session. For instance, the client device may not have installed the appropriate codecs to play back the multimedia content. In this case, the host device may transcode the multimedia content to a different format with which the client device is compatible, and copy the transcoded content to a different network location accessible by the client device. The host device thus instructs the client device to access the transcoded multimedia at that location.

As noted, the remote desktop client device ultimately accesses and plays back the multimedia content outside of the context of the remote desktop session. That is, the multimedia content may not itself be streamed or otherwise transmitted from the remote desktop host device to the client device. In this respect, the techniques differ from multimedia redirection (MMR) and similar such techniques in which multimedia content is redirected from a host device to a client device within a remote desktop session.

In comparison to MMR and other such techniques, the techniques described herein can use less network bandwidth of the host device, since the multimedia content is not actually transmitted from the host device to the client device. Such a reduction in network bandwidth usage can be beneficial particularly in the case of a host device having multiple virtual machines with which client devices of corresponding users establish respective remote desktop sessions. Unlike MMR, the techniques described herein can also be used with bidirectional multimedia content, as well as unidirectional multimedia content that is in a format with which the remote device is incompatible.

Figure 1:
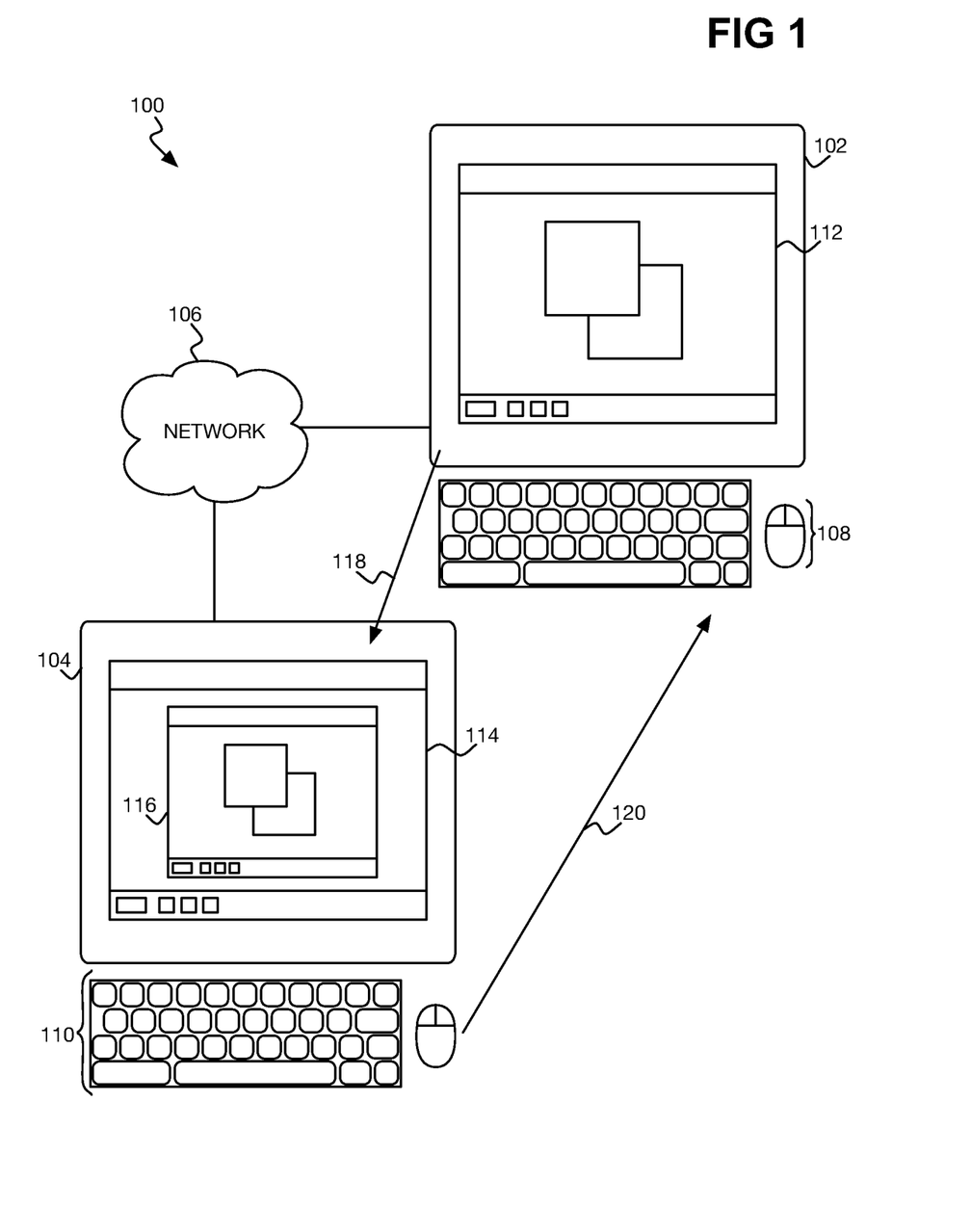
FIG. 1 is a diagram of an example system in which a remote desktop session has been established between a host computing device and a client computing device.
Figure 2:
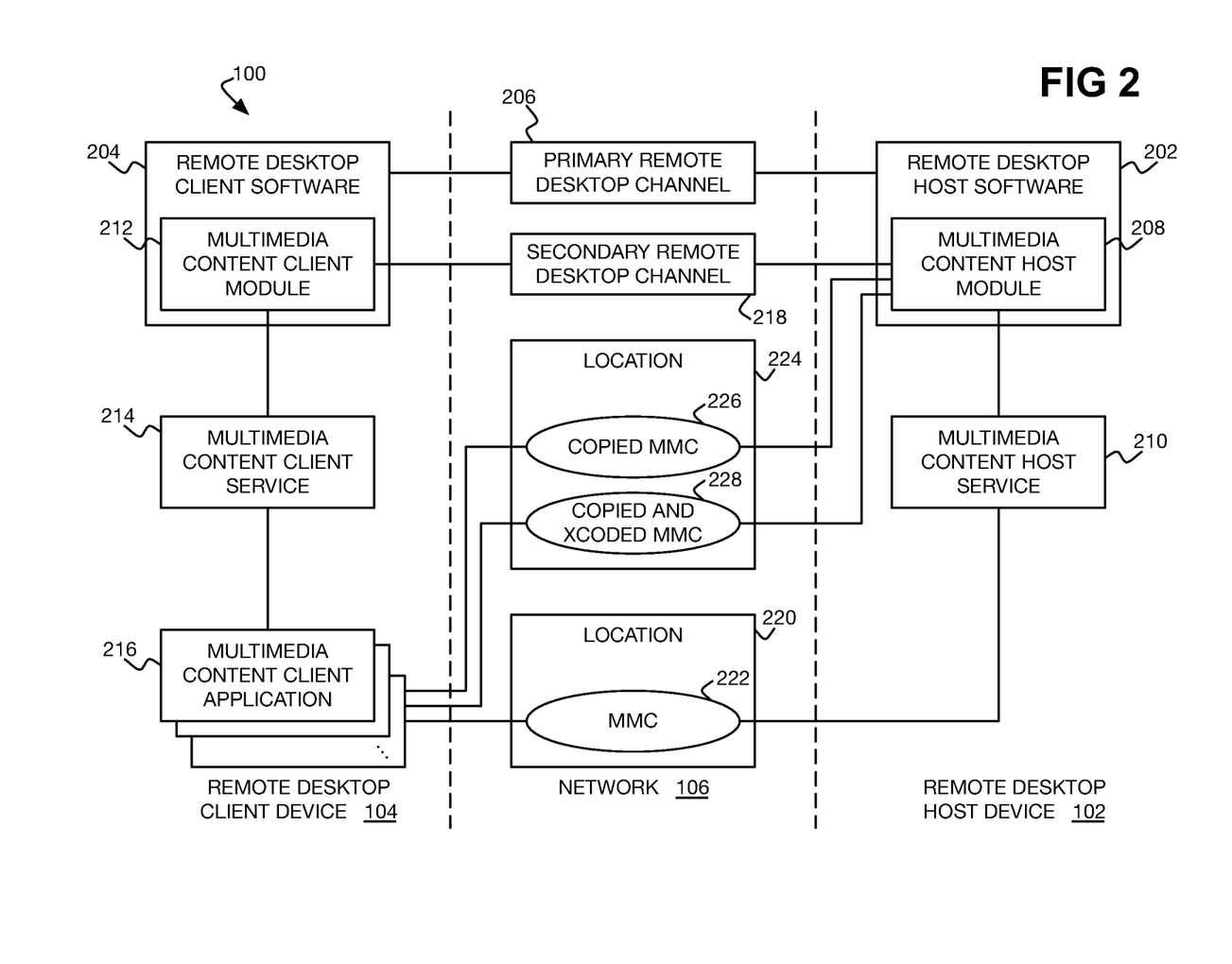
FIG. 2 is a diagram of the example system of FIG. 1 in more detail.

FIGS. 1 and 2 show an example system 100 in which a remote desktop session is established between a remote desktop host device 102 and a remote desktop client device 104 over a network 106. The host device 102 can be a computing device like a desktop, laptop, or notebook computer, or other type of computing device, of a user that the user remotely uses within the remote desktop session via the client device 104. The client device 104 can also be a computing device like a desktop, laptop, or notebook computer, or another type of computing device, such as a smartphone, a tablet computing device, a thin client device, and so on.

The remote desktop host device 102 may instead be a computing device like a server or other type of computer that runs multiple virtual machines that can concurrently be remotely used by users within respective remote desktop sessions. In this case, just a single such remote desktop session between the host device 102 and the remote desktop client device 104 of one such user is depicted in FIGS. 1 and 2. In either case, the network 106 may be or include the Internet, an extranet, an intranet, a telephony network, a mobile communications network, a wired network, and/or a wireless network, among other types of networks.

As depicted in FIG. 1, the remote desktop host device 102 may render a graphical user interface (GUI) desktop 112, which may or may not be actually displayed at the host device 102 if the device 102 is headless. The remote desktop client device 104 can also render and display its own GUI desktop 114. The host device 102 streams or otherwise transmits its desktop 112 to the client device 104 within the remote desktop session, per arrow 118, and the client device 104 can accordingly display the desktop 112 to the user as if the user were instead physically located at host device 102. In the example, the desktop 112 of the host device 102 is displayed within a window 116 of the desktop 114 of the client device 104, but may instead be displayed full-screen such that the desktop 114 is hidden.

As also depicted in FIG. 1, the remote desktop client device 104 may include input devices 110, such as a keyboard and a pointing device like a mouse, at which the user can directly enter input at the client device 104. The client device 104 transmits the entered input to the remote desktop host device 102 within the remote desktop session, per arrow 120, and the host device 102 processes the input as if the input were entered on input devices 108 of and located at the host device 102 itself. The host device 102 may not actually include such input devices 108, however, such as in the case in which the host device 102 is a server running multiple virtual machines for remote usage by corresponding users within respective remote desktop sessions.

Per FIG. 2, the remote desktop host device 102 runs remote desktop host software 202, and the remote desktop client device 104 runs remote desktop client software 204. The host software 202 and the client software 204 may be part of the same software solution by which a remote desktop session can be established between the host device 102 and the client device 104, or may be otherwise compatible with the same type of remote desktop protocol. A primary remote desktop channel 206 is established over the network 106 between the host software 202 and the client software 204. Output from the host device 102 to the client device 104 as described in relation to FIG. 1 is transmitted within the primary channel 206, as is input from the client device 104 to the host device 102 as also described in relation to FIG. 1.

The remote desktop host software 202 can include a multimedia content host module 208, and the remote desktop client software 204 can likewise include a multimedia content client module 212. In the example, the modules 208 and 212 are part of the software 202 and 204, respectively, but in another implementation may be external to, but still in communication with, the software 202 and 204. A secondary remote desktop channel 218, which can be a dynamic virtual channel (DVC) in the case of a virtual desktop infrastructure (VDI) remote desktop solution, is established between the host module 208 and the client module 212.

The secondary remote desktop channel 218 is provided for the host device 102 providing instructions to the client device 104 to directly access multimedia content 222 that was initially accessed at the host device 102 by the client device 104 within the remote desktop session. Such instructions inform the client device 104 to directly access this multimedia content 222, outside of the remote desktop session. That is, unlike MMR and other techniques in which multimedia content 222 may be redirected over the secondary remote desktop channel 218 and thus within the remote desktop session, in the techniques described herein the multimedia content 222 is not provided over the secondary remote desktop channel 218 (or the primary emote desktop channel 206). Rather, the multimedia content 222 is instead accessed outside of the remote desktop session encompassing the channels 206 and 218, with just the instructions for accessing the multimedia media content 222 outside of the remote desktop session being provided over the secondary remote desktop channel 218 in particular.

The remote desktop host device 102 can include a multimedia content host service 210, and the remote desktop client device 104 can likewise include a multimedia content client service 214. The host service 210 and the client service 214 may run on or in conjunction with operating systems of the host device 102 and the remote device 104, respectively. The host service 210 can detect the access of multimedia content 222 stored on (e.g., streamable from) host-accessible location 220 over the network 106. The location 220 may be specified in the form of a universal resource locators (URL), for instance.

The URL may identify the protocol of the multimedia content 222, and the filename of the content 222 with or without a file extension indicating the format of the content 222. The format of the content 222 may instead be provided as metadata within the content 222 itself, or be provided externally from the content 222. The location 220 may instead be a location of a storage device of the host device 102, as is the case with multimedia content 222 stored locally as a file on the device 102. The client service 214, by comparison, can detect with which multimedia types (e.g., which formats) the client device 104 is compatible and thus can play back.

The remote desktop client device 104 also can include multimedia content client applications 216 that can play back multimedia content. Each client application 216 can play back the same or different type(s) of multimedia content, and may be particular to respective types of multimedia content. For example, a web browser application 216 or a standalone multimedia player application 216 may be able to play back multiple formats of unidirectional audio and video. By comparison, a video or audio-only meeting application 216 may be able to play back a corresponding format of bidirectional video or audio-only meeting. The terminology "play back" in the context of such bidirectional multimedia content encompasses the connection to and participation in a corresponding video or audio-only meeting, conference, or call by the client device 104 in this respect.

The multimedia content host service 210 of the remote desktop host device 102 may detect access of the multimedia content 222 by the remote desktop client device 104 at the remote device 102 within the remote desktop session in a number of different ways. For example, the host service 210 may listen to an operating system application programming interface (API) to detect that a multimedia encoder or decoder is being loaded or that multimedia content in the form of a file stored on the host device 102 is being opened. The host service 210 may monitor network traffic to detect that the traffic contains a request related to streamable multimedia content, or a known URL or API for a bidirectional multimedia content application. The host service 210 may detect that a particular GUI element within a multimedia application has been selected, such as a play button. The host service 210 may further be in the form of a web browser plugin or extension that can detect whether multimedia content is being accessed within a web browser application.

The multimedia content client service 214 of the remote desktop client device 104 can detect with which multimedia types (e.g., which formats) the client device 104 is compatible and thus can play back in a number of different ways. The client service 214 may inspect a database of software installed by the operating system of the client device 104 to determine with which multimedia formats or protocols the multimedia content applications 216 are compatible. The client service 214 may perform an API test to determine if a given API is available for use, including by attempting to create a new bidirectional multimedia content meeting via a specific API, such that if the meeting is successfully created then the API in question is available at the client device 104. The client service 214 may further inspect the installed codecs on the client device 104, and identify any available hardware multimedia decoders of the device 104.

In operation, once the remote desktop host software 202 and the remote desktop client software 204 have established the primary remote desktop channel 206 by which the host device 102 can be remotely used by the client device 104 within a remote desktop session, the host module 208 and the client module 212 may establish the secondary remote desktop channel 218. The host module 208 can negotiate with the client module 212 over the secondary channel 218 to determine the multimedia content playback capabilities of the client device 104. The client module 212 may interrogate the client service 214 to learn of these capabilities in this respect, and report back to the host module 208.

The multimedia content host service 210 at some point can detect access of multimedia content 222 at the host device 102 by the client device 104 within the remote desktop session (i.e., within the primary remote desktop channel 206). The host service 210 reports such access detection to the host module 208, which can determine if the client device 104 is compatible with the format of the multimedia content 222 (e.g., whether the device 104 is able to play back the content 222). The host module 208 can make this determination based on its prior negotiation with the client module 212, or the host module 208 may responsive to detecting access of the multimedia content 222 interrogate the client module 212 over the secondary channel 218 to determine whether the client device 104 is compatible.

If the remote desktop client device 104 is compatible with the format of the multimedia content 222, the multimedia content host module 208 may then determine whether the client device 104 is able to access the location 220 on the network 106 at which the multimedia content 222 is stored or from which the multimedia content 222 is retrievable or streamable. For example, the host module 208 may interrogate the client module 212 over the secondary channel 218 to determine if the client device 104 is able to access the location 220 on the network 106. Therefore, in one implementation there may be ultimately three cases: the client device 104 is incompatible with the multimedia content 222 (regardless of whether the device 104 can access the location 220 of the content 222 or not); the client device 104 is compatible with the multimedia content 222 but cannot access the location 220 of the content 222; and the client device 104 is compatible with the multimedia content 222 and can also access the location 220.

In each case, the multimedia content host module 208 provides instructions to the multimedia content client module 212 over the secondary channel 218 indicating that the client device 104 is to directly access and play back the content 222 outside of the remote desktop session. In the case in which the client device 104 is compatible with the multimedia content 222 and can access the location 220 at which the content 222 is stored or from which the content 222 is streamed, the instructions specify the location 220 of the multimedia content 222 at which the content 222 was initially accessed within the remote desktop session. The instructions can further specify that the client device 104 is to access the multimedia content 222 in the same way in which the content 222 was initially accessed.

The instructions may implicitly specify the way in which the client device 104 is to access the content 222. For example, the extension of the filename under which the content 222 is stored at the location 220, or metadata within the content 222, may itself indicate to the client device 104 the file format of the content 222 and thus how to play back the content 222. As another example, the URL by which the content 222 is accessed from the location 220 may itself indicate to the client device 104 the streaming or other protocol by which the device 104 plays back the content 222. The instructions may further specify any authentication credentials for the client device 104 to access the content 222 from the location 220. The client module 212 receives the instructions, and instructs the client service 214 to access and play back the content 222 from the location 220, such as via initiating launching of the appropriate multimedia content client application 216.

In the case in which the client device 104 is compatible with the multimedia content 222 but cannot access the location 220 of the content 222, the host module 208 can copy the multimedia content 222 from the location 220 to a location 224 that is accessible by the client device 104 over the network 106, as copied multimedia content 226. For example, the host module 208 may as part of its initial negotiation with the client module 212 identify such a location 224, or may, when the multimedia content 222 is initially accessed, interrogate the client module 212 to identify the location 224. The instructions sent from the host module 208 to the client module 212 therefore specify the location 224 of the copied multimedia content 226.

The instructions can also specify that the client device 104 is to access the content 226 in the same way in which the multimedia content 222 was initially accessed, which may be implicit as noted above. The instructions may further specify any authentication credentials for the client device 104 to access the content 226 from the location 224. The client module 212 then instructs the client service 214 to access the content 226 from the location 224.

In the case in which the client device 104 is incompatible with the multimedia content 222, the host module 208 can first transcode the content 222 to a format with which the client device 104 is compatible. The host module 208 also copies the transcoded content 222 to the location 224 that is accessible by the client device 104, as copied and transcoded multimedia content 228. The instructions sent from the host module 208 to the client module 208 therefore specify the location 224 of the copied and transcoded multimedia content 228.

The instructions can implicitly or explicitly specify the way in which the client device 104 is to access the content 228, which may differ from the way in which the multimedia content 222 was initially accessed insofar as the content 222 has been transcoded as the content 228. For example, the instructions may implicitly specify a streaming protocol via the URL at which the content 228 is accessed from the location 224 that to be used to stream the copied and transcoded multimedia content 228. As before, the instructions may further specify any authentication credentials for the credential device 104 to access the content 226 from the location 224. The client module 212 instructs the client service 214 to access the content 228 from the location 224.

It is noted that copying of the transcoded content 222 to the location 224 as the copied and transcoded multimedia content 228 can begin before transcoding of the content 222 has been completed. That is, as the content 222 is transcoded, the content 222 may be copied to the location 224 as the copied and transcoded multimedia content 228. Therefore, the client service 214 can begin playback of the copied and transcoded multimedia content 228 almost immediately, such as in a streaming manner.

In each of these cases, the remote desktop client device 104 directly accesses and plays back the multimedia content 222 (either as the content 222 itself, as the copied multimedia content 226, or as the copied and transcoded multimedia content 228), outside of the remote desktop session established between the host device 102 and the client device 104. The multimedia content 222 is not transmitted within the remote desktop session, such as over the primary channel 206 or the secondary channel 218. Because playback directly occurs at the client device 104, the host module 208 also instructs the host service 210 to prevent (e.g., terminate) playback of the multimedia content 222 at the host device 102, so that such playback does not occur within the remote desktop session (e.g., within the primary channel 206).

It is noted that in other cases, the host device 102 may copy the multimedia content 222 to the location 224 as the copied multimedia content 226, even if the client device 104 is able to access the location 220 and is compatible with the content 222 as stored at the location 220. Similarly, the host device 102 may transcode and copy the multimedia content 222 to the location 224 as the copied and transcoded multimedia content 228 even if the client device 104 is able to access the location 220 and/or is compatible with the content 222 as stored at the location 220. For example, the host device 102 and/or remote device 104 may determine that due to degraded network performance between the remote device 104 and the location 220, that the multimedia content 222 should be copied to the location 224 as the content 226 or transcoded and copied to the location 224 as the content 228.

The network performance between the remote device 104 and the location 224 may be better than between the remote device 104 and the location 220, for instance. That is, the remote device 104 may be able to access the location 224 with less latency, at higher throughput, or otherwise with better network performance than the location 220. Furthermore, the content 222 may be transcoded as the content 228 in a format (e.g., resolution) that can be communicated to the remote device 104 with less network throughput. For example, the content 222 may be an ultra high definition (UHD) video file that may be too large for the remote device 104 to download in a reasonable length of time based on the network performance of the device 104. Therefore, transcoding the content 222 to a high definition (HD) or a standard definition (SD) video file, as the content 228, can permit faster downloading by the remote device 104. That is, the content 228 is more quickly transmitted to the remote device 104 than the content 222 is.

FIGS. 3A, 3B, 3C, and 3D show example methods 300, 340, 360, and 380, respectively, by which multimedia content accessed at a host device within a remote desktop session established between the host device and a client device can instead be directly accessed at the client device outside of the remote desktop session. The methods 300, 340, 360, and 380 can be performed within, and are described in relation to, the system 100 of FIGS. 1 and 2, for instance. The left parts of the methods 300, 340, 360, and 380 are performed by the remote desktop client device 104, whereas the right parts are performed by the remote desktop host device 102. The left and right parts of the methods 300, 340, 360, and 380 can each be implemented as program code stored on a non-transitory computer-readable data storage medium and executed by a processor of a computing device (e.g., the client device 104 or the host device 102).

Figure 3A:
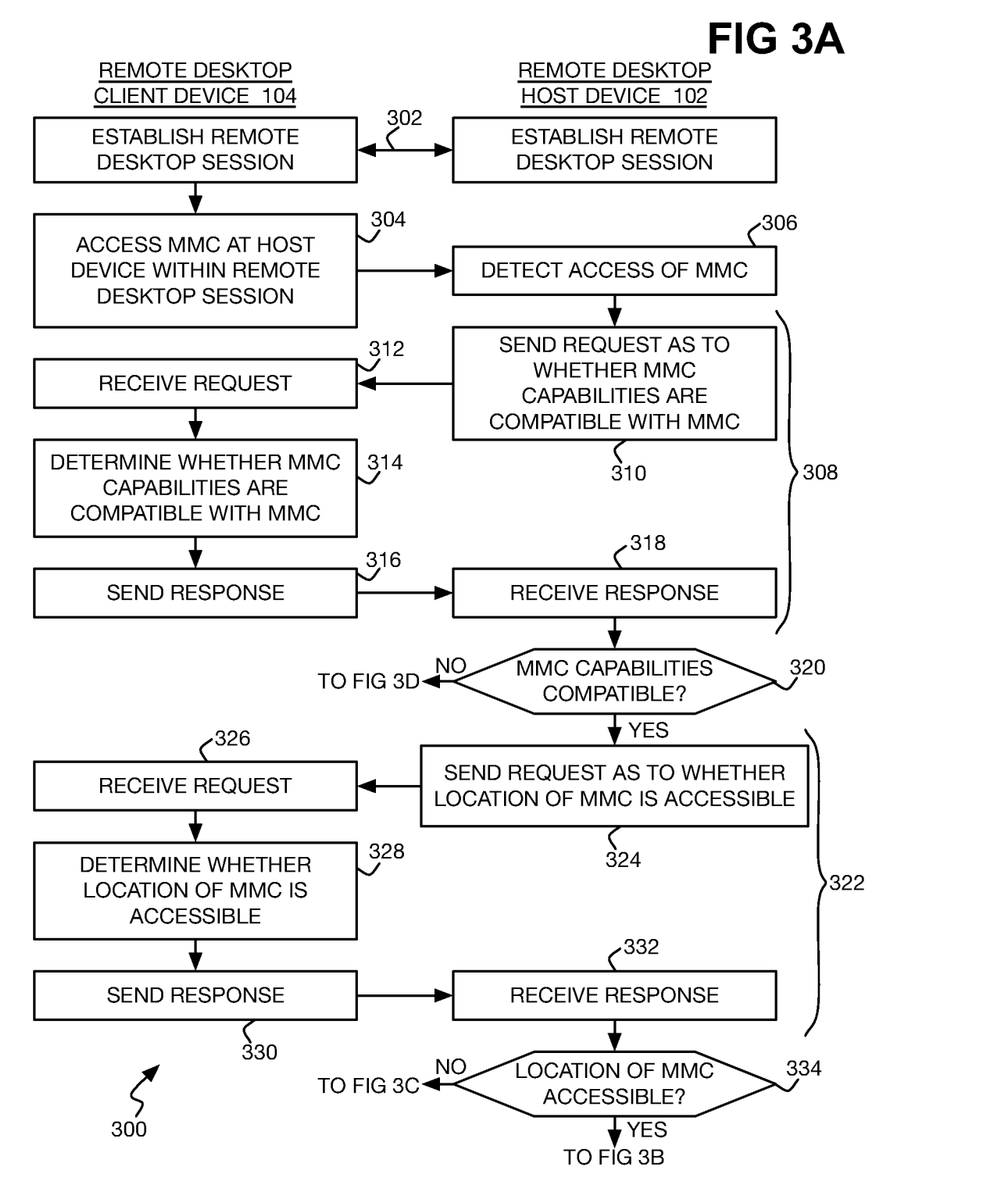
FIGS. 3A, 3B, 3C, and 3D are flowcharts of example methods by which multimedia content accessed at a host computing device within a remote desktop session established between the host device and a client computing device can instead be directly accessed at the client device outside of the remote desktop session.

Referring first to FIG. 3A, in the method 300 a remote desktop session is established between the host device 102 and the client device 104 to permit remote usage of the host device 102 at the client device 104 (302). The client device 104 accesses multimedia content at the host device 102 within the remote desktop session (304), and such access is detected by the host device 102 (306). The host device 102 determines whether the multimedia content capabilities of the client device 104 are compatible with the format of the multimedia content as has been accessed at the host device 102 (308).

As one example, the host device 102 may send a request to the client device 104 to determine whether its multimedia content capabilities are compatible (310). The client device 104 receives the request (312), determines whether its multimedia content capabilities are compatible with the format of the multimedia content in question (314), and sends a response back to the host device 102 (316), which receives the response (318). If the multimedia content capabilities of the client device 104 are compatible with the format of the multimedia content (320), then the host device 102 also determines whether the location at which the multimedia content has been accessed at the host device 102 within the remote desktop session is accessible at the client device 104 (322).

As one example, the host device 102 may send a request to the client device 104 to determine whether this location of the multimedia content is accessible by the client device 104 (324), which receives the request (326). The client device 104 determines whether it is able to access the location (328), and sends a response back to the host device 102 (330), which receives the response (332). If the location at which the multimedia content has been accessed at the host device 102 is also accessible at the client device 104 (334), then the method 300 proceeds to FIG. 3B. If the location is not accessible at the client device 104 (334), then the method 300 instead proceeds to FIG. 3C. Finally, if the client device 104 does not even have compatible multimedia capabilities (32), then the method 300 proceeds to FIG. 3D.

Figure 3B:
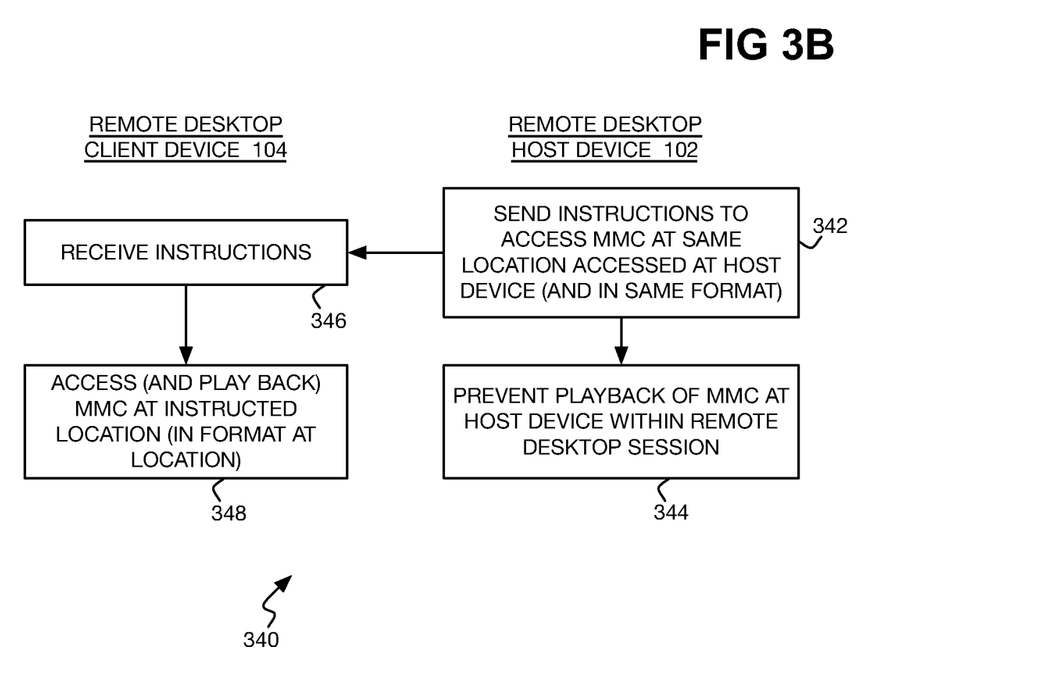

Referring to FIG. 3B, the method 340 is performed in the case in which the client device 104 has multimedia capabilities compatible with the format of the multimedia content, and is also able to access the location of the content. The host device 102 sends instructions to the client device 104 to access the multimedia content at the location at which (and in the same format in which) the content was accessed at the host device 102 within the remote desktop session (342). The host device 102 also prevents playback of the multimedia content at the host device 102 within the remote desktop session (344). The client device 104 receives the instructions sent by the host device 102 (346), and accordingly accesses (and plays back) the multimedia content at the instructed location, in the format as stored at or streamable from that location (348).

Figure 3C:
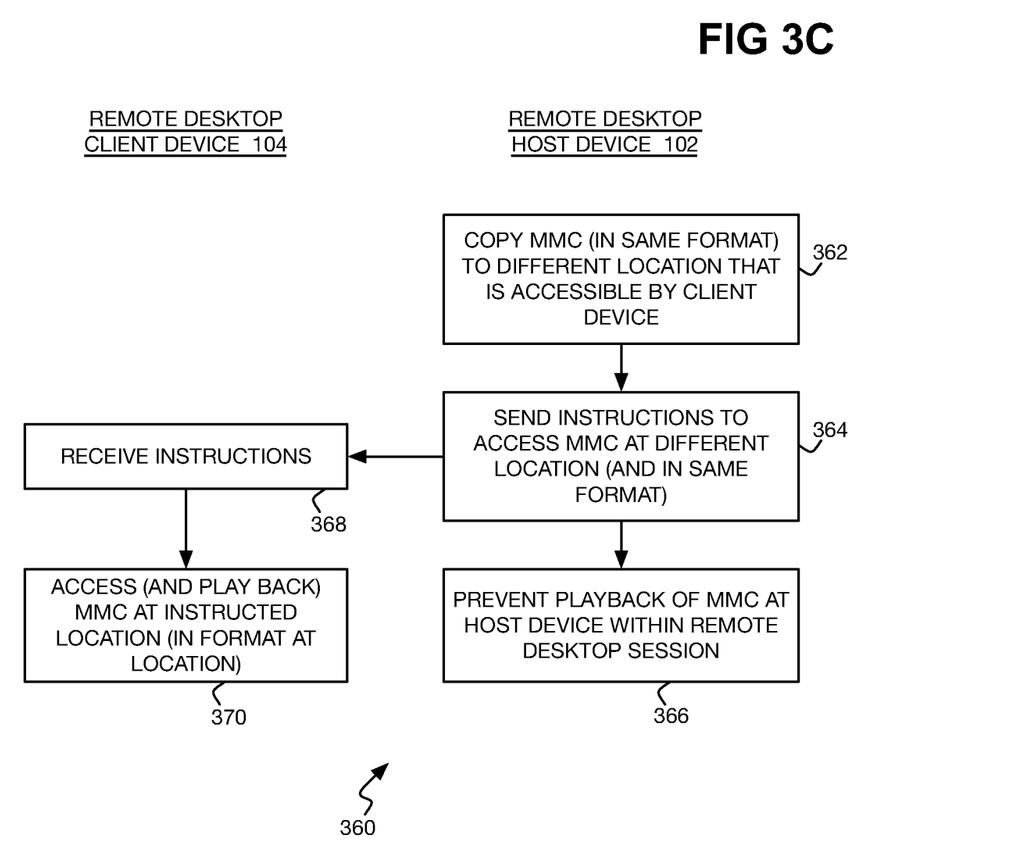

Referring to FIG. 3C, the method 360 is performed in the case in which the client device 104 has multimedia capabilities compatible with the format of the multimedia content, but is not able to access the location of the content. The host device 102 copies the multimedia content (in the same format) to a different location that is accessible by the client device 104 (362). The host device 102 sends instructions to the client device 104 to access the multimedia content at this different location (and in the same format in which the content was accessed at the host device 102 within the remote desktop session) (364), and prevents playback of the multimedia content at the host device 102 within the remote desktop session (366). The client device 104 receives the instructions (368), and accordingly accesses (and plays back) the multimedia content at the instructed location, in the format as stored at or streamable from the location (370).

Figure 3D:
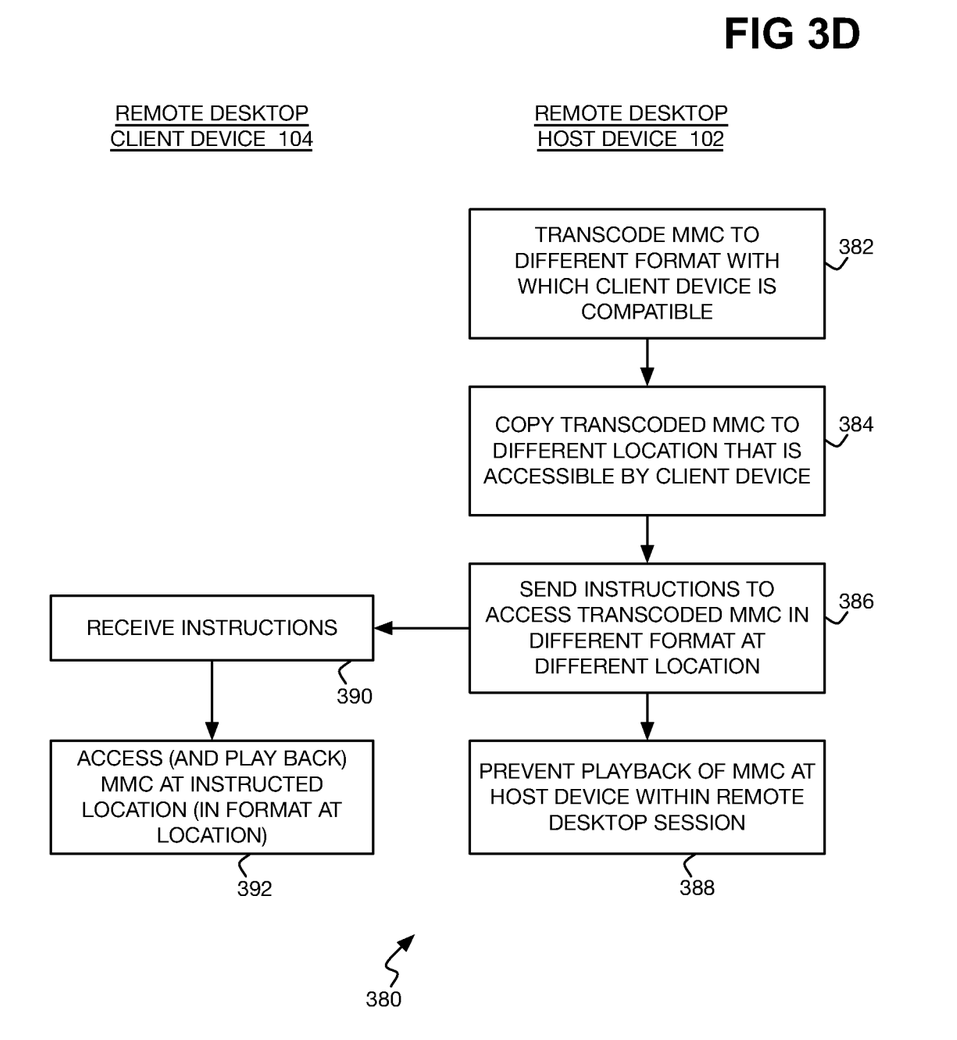

Referring to FIG. 3D, the method 380 is performed in the case in which the client device 104 has multimedia capabilities incompatible with the format of the multimedia content. The host device 102 transcodes the multimedia content to a different format with which the client device 104 is compatible (382), and copies the transcoded multimedia content to a different location that is accessible by the client device 104 (384). The host device 102 sends the instructions to the client device 104 to access the multimedia content at this different location (and in the different format to which the content has been transcoded) (386), and prevents playback of the multimedia content at the host device 102 within the remote desktop session (388). The client device 104 receives the instructions (390), and accordingly accesses (and plays back) the multimedia content at the instructed location, in the transcoded format (392).

Figure 4:
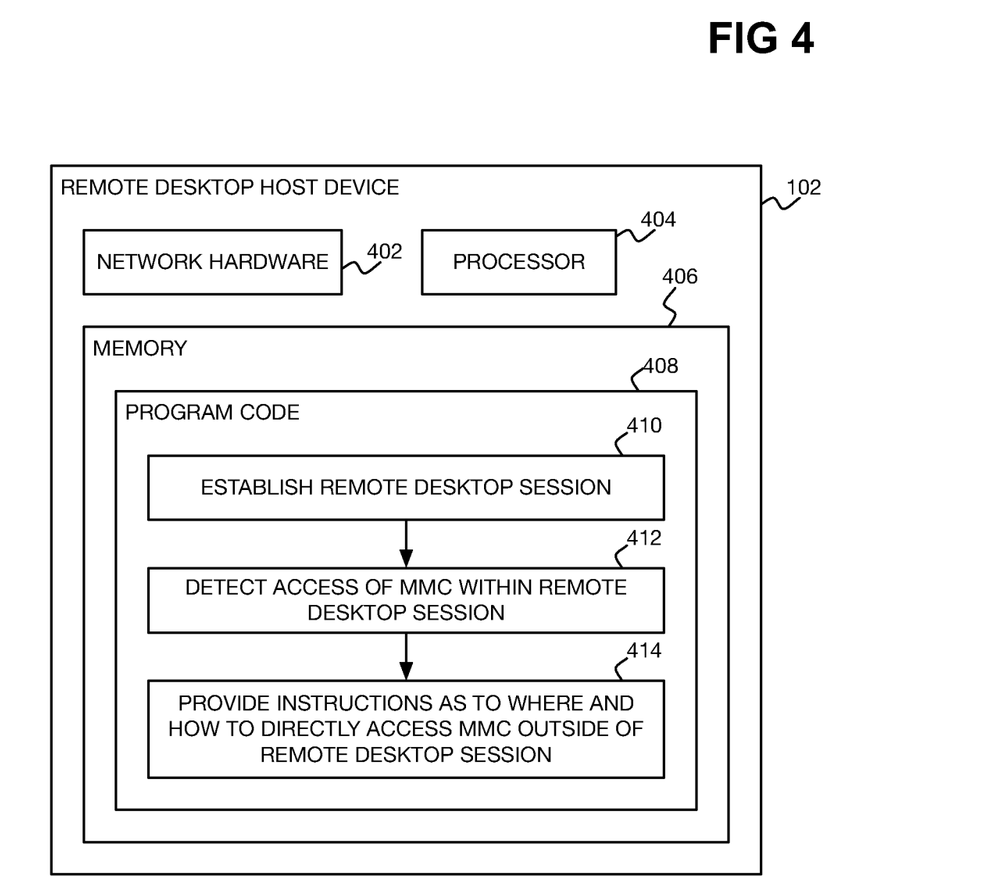
FIG. 4 is a diagram of an example remote desktop host computing device.

FIG. 4 shows an example remote desktop host computing device 102. The host device 102 includes network hardware 402 to communicatively connect to a remote desktop client device 104. The host device 102 includes a processor 404, and a memory 406 storing program code 408 executable by the processor 404 to perform processing. The processing includes establishing a remote desktop session with the client device 104 to permit remote usage of the host device 102 at the client device 104 (410). The processing includes detecting access of multimedia content at the host device 102 by the client device 104 within the remote desktop session (412). The processing includes, in response to detecting access of the multimedia content within the remote desktop session, providing instructions to the client device 104 to directly access the multimedia content outside of the remote desktop session (414).

Figure 5:
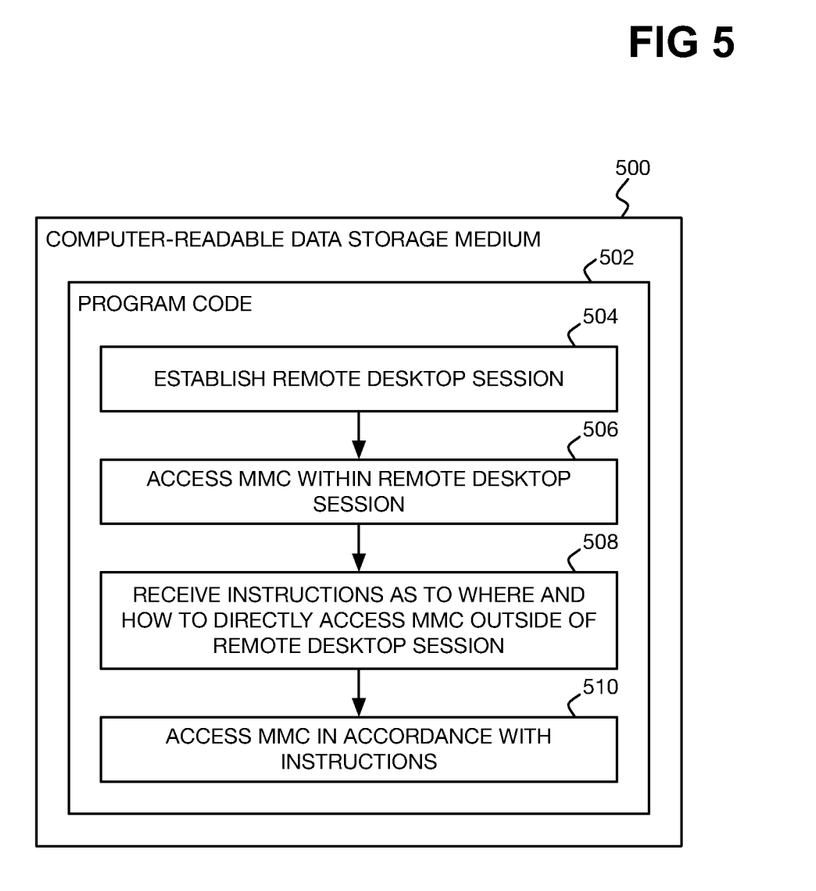
FIG. 5 is a diagram of an example non-transitory computer-readable data storage medium storing program code executable by a remote desktop client computing device.

FIG. 5 shows an example non-transitory computer-readable data storage medium 500 storing program code 502 executable by a remote desktop client device 104 to perform processing. The processing includes establishing a remote desktop session with a remote desktop host device 102 to remotely use the host device 102 at the remote desktop client device 104 (504), and accessing multimedia content at the host device 102 within the remote desktop session (506). The processing includes receiving instructions from the host device 102 to directly access the multimedia content outside of the remote desktop session (508), and directly accessing the multimedia content outside of the remote desktop session in accordance with the instructions (510).

Techniques have been described herein for accessing multimedia content in the context of a remote desktop session. Specifically, when a client device accesses multimedia content at a host device within a remote desktop session, the host device instead provides instructions to the client device to directly access the content outside of the remote desktop session. Therefore, the multimedia content can be displayed at the client device in a manner that provides for improved playback of the content as compared to if the multimedia content were played back within the remote desktop session itself, and permits the playback of bidirectional multimedia content that may not be possible within the remote desktop session itself.

We claim:

1. A remote desktop host device comprising:
   network hardware to communicatively connect to a remote desktop client device;
   a processor; and
   a memory storing program code executable by the processor to:
      establish a remote desktop session with the remote desktop client device to permit remote usage of the remote desktop host device at the remote desktop client device;
      detect access of multimedia content at the remote desktop host device by the remote desktop client device within the remote desktop session; and
      in response to detecting access of the multimedia content within the remote desktop session, provide instructions to the remote desktop client device to directly access the multimedia content outside of the remote desktop session.

2. The remote desktop host device of claim 1, wherein the program code is executable by the processor to further:
   determine whether multimedia content capabilities of the remote desktop client device are compatible with a format of the multimedia content as has been accessed at the remote desktop host device; and in response to determining that the multimedia content capabilities of the remote desktop client device are compatible with the format of the multimedia content as has been accessed at the remote desktop host device, determine whether a location at which the multimedia content has been accessed at the remote desktop host device is accessible at the remote desktop client device directly, wherein, in response to determining that the location at which the multimedia content has been accessed at the remote desktop host device is accessible at the remote desktop client device directly, the instructions provided to the remote desktop client device instruct the remote desktop client device to access the multimedia content at the location at which the multimedia content has been accessed at the remote desktop host device in the format as has been accessed at the remote desktop host device.

3. The remote desktop host device of claim 2, wherein the program code is executable by the processor to further:

in response to determining that the location at which the multimedia content has been accessed at the remote desktop host device is inaccessible at the remote desktop client device directly, copy the multimedia content in the format as has been accessed at the remote desktop host device from the location at which the multimedia content has been accessed at the remote desktop host device to a different location accessible at the remote desktop client device directly, wherein the instructions provided to the remote desktop client device instruct the remote desktop client device to access the multimedia content at the different location to which the multimedia content has been copied in the format as has been accessed at the remote desktop host device.

4. The remote desktop host device of claim 2, wherein the program code is executable by the processor to further:

in response to determining that the multimedia content capabilities of the remote desktop client device are incompatible with the format of the multimedia content as has been accessed at the remote desktop host device, transcode the multimedia content to a different format with which the multimedia content capabilities of the remote desktop client device are compatible; and copy the multimedia content as has been transcoded to the different format to a different location accessible at the remote desktop client device directly, wherein the instructions provided to the remote desktop client device instruct the remote desktop client device to access the multimedia content at the different location to which the multimedia content has been copied in the different format to which the multimedia content has been transcoded.

5. The remote desktop host device of claim 2, wherein the program code is executable by the processor to further:

prevent playback of the multimedia content at the remote desktop host device within the remote desktop session responsive to the access of the multimedia content at the remote desktop host device by the remote desktop client device within the remote desktop session.

6. The remote desktop host device of claim 1, wherein the program code is executable by the processor to further:

copy the multimedia content in a format as has been accessed at the remote desktop host device from a location at which the multimedia content has been accessed at the remote desktop host device to a different location that the multimedia content is accessible by the remote desktop client device with improved network performance than the location; or transcode the multimedia content to a different format with which multimedia content capabilities of the remote desktop client device are compatible and in which the multimedia content is transmittable to the remote desktop client device improved speed than in the format.

7. The remote desktop host device of claim 1, wherein the program code is executable by the processor to:

permit the remote usage of the remote desktop host device at the remote desktop client device over a primary remote desktop channel, wherein the program code is to provide the instructions to the remote desktop client device over a secondary remote desktop channel different than the primary remote desktop channel.

8. The remote desktop host device of claim 1, wherein the multimedia content includes at least one of: unidirectional video content, unidirectional audio content, bidirectional video content, or bidirectional audio content, and wherein the program code is executable by the processor to: permit the remote usage of the remote desktop host device within the remote desktop session by a user at the remote desktop client device as if the user were located at the remote desktop host device.

9. A non-transitory computer-readable data storage medium storing program code executable by a remote desktop client device to:

establish a remote desktop session with a remote desktop host device to remotely use the remote desktop host device at the remote desktop client device;

access multimedia content at the remote desktop host device within the remote desktop session;

receive instructions from the remote desktop host device to directly access the multimedia content outside of the remote desktop session; and directly access the multimedia content outside of the remote desktop session in accordance with the instructions.

10. The non-transitory computer-readable data storage medium of claim 9, wherein the program code is executable to further:

receive a request from the remote desktop host device as to whether multimedia content capabilities of the remote desktop client device are compatible with a format of the multimedia content as has been accessed at the remote desktop host device;

in response to receiving the request, determine whether the multimedia content capabilities of the remote desktop client device are compatible with the format of the multimedia content as has been accessed at the remote desktop host device; and send a response to the remote desktop host device as whether the multimedia content capabilities of the remote desktop client device are compatible with the format of the multimedia content as has been accessed at the remote desktop host device.

11. The non-transitory computer-readable data storage medium of claim 10, wherein the program code is executable to further:

receive a second request from the remote desktop host device as to whether a location at which the multimedia content has been accessed at the remote desktop host device is accessible at the remote desktop client device directly;

in response to receiving the request, determine whether the location at which the multimedia content has been accessed at the remote desktop host device is accessible at the remote desktop client device directly; and send a second response to the remote desktop host device as to whether the location at which the multimedia content has been accessed at the remote desktop host device is accessible at the remote desktop client device directly.

12. The non-transitory computer-readable data storage medium of claim 11, wherein the instructions received from the remote desktop host device instruct the remote desktop client device to access the multimedia content at the location at which the multimedia content has been accessed at the remote desktop host device in the format as has been accessed at the remote desktop host device.

13. The non-transitory computer-readable data storage medium of claim 11, wherein the instructions received from the remote desktop host device instruct the remote desktop client device to access the multimedia content at a different location to which the multimedia content has been copied in the format as has been accessed at the remote desktop host device.

14. The non-transitory computer-readable data storage medium of claim 11, wherein the instructions received from the remote desktop host device instruct the remote desktop client device to access the multimedia content at a different location to which the multimedia content has been copied in a different format to which the multimedia content has been transcoded.

15. The non-transitory computer-readable data storage medium of claim 9, wherein the multimedia content includes at least one of: unidirectional video content, unidirectional audio content, bidirectional video content, or bidirectional audio content, wherein the program code is executable to; permit remote usage of the remote desktop host device within the remote desktop session by a user at the remote desktop client device as if the user were located at the remote desktop host device.

* * * * *

UNITED STATES PATENT AND TRADEMARK OFFICE
CERTIFICATE OF CORRECTION

| | | |
|---|---|---|
| PATENT NO. | : 12,314,742 B2 | Page 1 of 1 |
| APPLICATION NO. | : 18/560593 | |
| DATED | : May 27, 2025 | |
| INVENTOR(S) | : Irwan Halim et al. | |

It is certified that error appears in the above-identified patent and that said Letters Patent is hereby corrected as shown below:

On the Title Page

Item (54), "REMOVE" should be --REMOTE--.

In the Specification

Column 1, Line 2, "REMOVE" should be --REMOTE--.

Signed and Sealed this
Fifteenth Day of July, 2025

Coke Morgan Stewart
*Acting Director of the United States Patent and Trademark Office*